United States Patent [19]

Ito et al.

[11] Patent Number: 4,565,091

[45] Date of Patent: Jan. 21, 1986

[54] APPARATUS FOR MEASURING THE QUANTITY OF AIRFLOW PASSING THROUGH AN INTAKE PASSAGE OF AN ENGINE

[75] Inventors: Katsunori Ito, Aichi; Susumu Akiyama, Kariya; Tiaki Mizuno, Toyota; Toshitaka Yamada; Tomoaki Abe, both of Nagoya, all of Japan

[73] Assignee: Nippondenso Co., Ltd., Kariya, Japan

[21] Appl. No.: 723,894

[22] Filed: Apr. 16, 1985

[30] Foreign Application Priority Data

Apr. 20, 1984 [JP] Japan ........................ 59-79642
Apr. 25, 1984 [JP] Japan ........................ 59-83339

[51] Int. Cl.$^4$ ........................ G01M 15/00
[52] U.S. Cl. ........................ 73/118; 73/204
[58] Field of Search ........................ 73/118, 204; 123/494

[56] References Cited

U.S. PATENT DOCUMENTS 4,357,829 11/1982 Kraus et al. ........................ 73/118 X
4,373,383 2/1983 Plapp et al. ........................ 73/118

FOREIGN PATENT DOCUMENTS 54-76182 6/1979 Japan .
55-104538 8/1980 Japan .
56-51618 5/1981 Japan .

*Primary Examiner*—Jerry W. Myracle
*Attorney, Agent, or Firm*—Cushman, Darby & Cushman

[57] ABSTRACT

Disposed in an intake pipe of an engine is a temperature-sensitive element formed of a resistance element whose resistance value varies with temperature. A heating current is supplied to the temperature-sensitive element through a transistor. The voltage of the heating current is set by a constant-voltage circuit. The temperature of the temperature-sensitive element is compared with a reference temperature of an auxiliary temperature-sensitive element. When the temperature of the temperature-sensitive element is increased to a predetermined level, an output signal is delivered from a comparator. A flip-flop circuit is reset by the output signal from the comparator, and is set by a start pulse signal. When the flip-flop circuit is set, the transistor is turned on, allowing the heating current to be supplied to the temperature-sensitive element. A burning-off instruction signal is supplied to a monostable multivibrator, and a signal with a duration suited for the burning-off operation is delivered from an AND circuit. In response to the output signal from the AND circuit, the flip-flop circuit is held set, and a reference voltage supplied to the differential amplifier is changed to a low level.

13 Claims, 21 Drawing Figures

F I G. 1
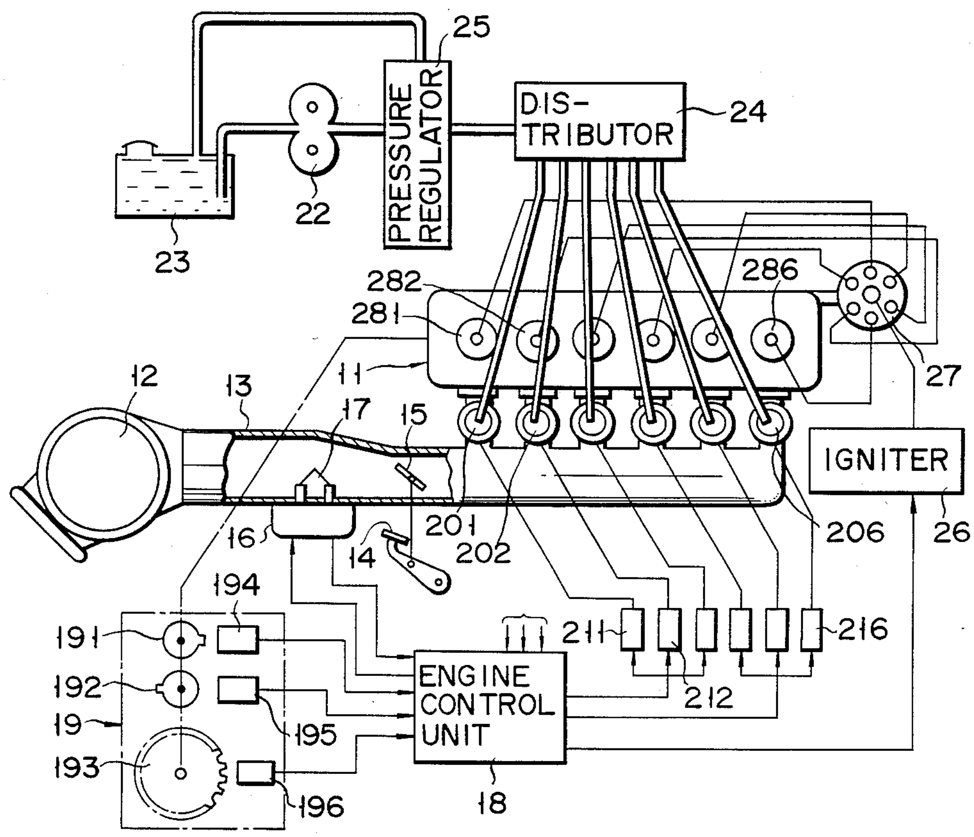
F I G. 2
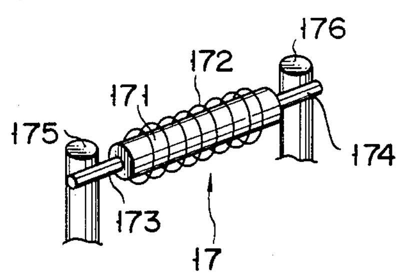
F I G. 3
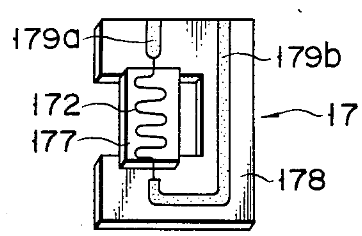

FIG. 4
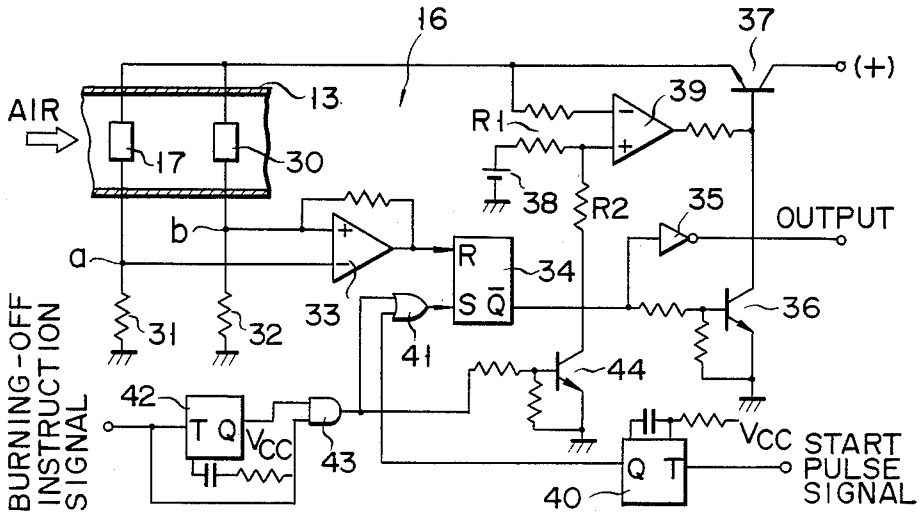
FIG. 5A
FIG. 5B
FIG. 5C
FIG. 5D
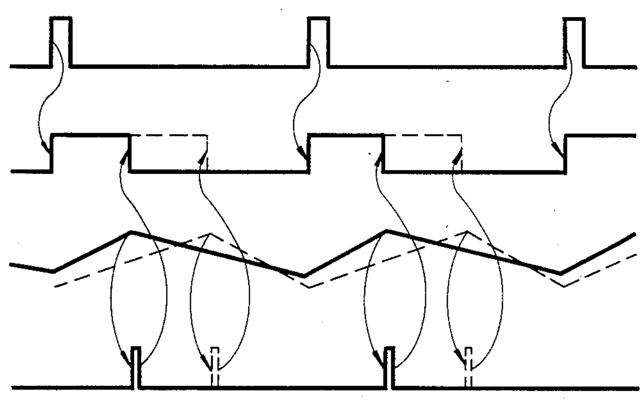

FIG. 6A
FIG. 6B
FIG. 6C
FIG. 6D
FIG. 6E
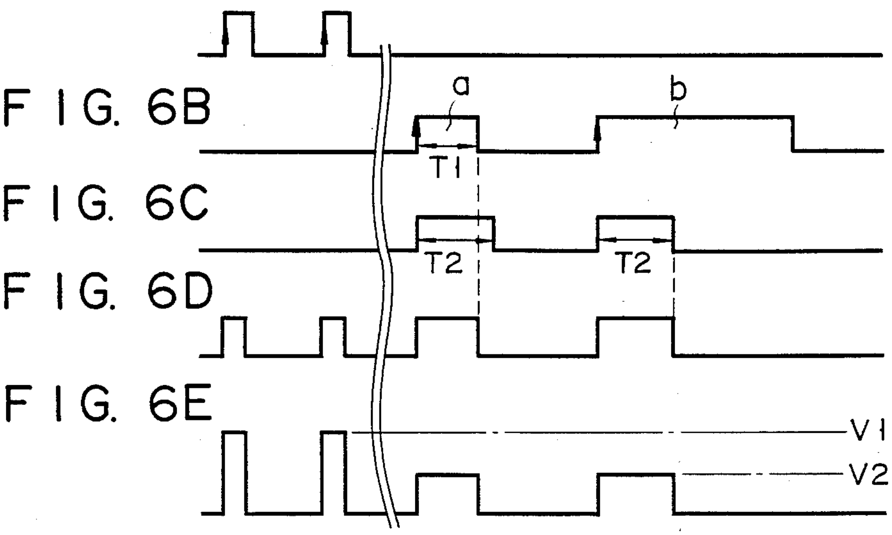
FIG. 7
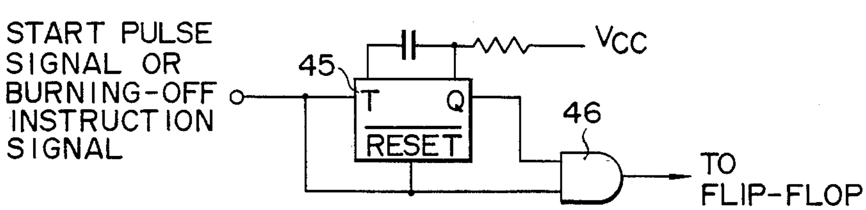

F I G. 8
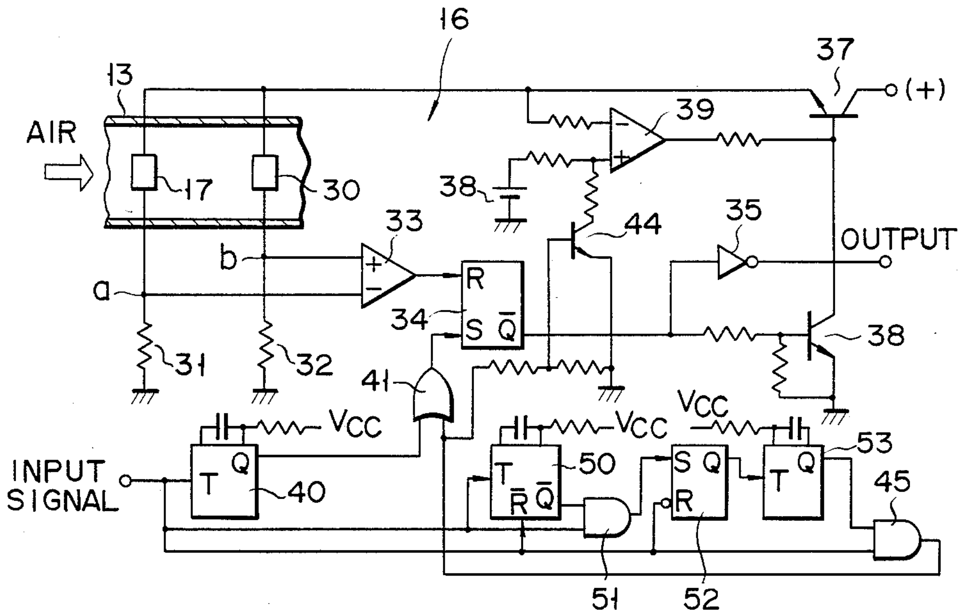

APPARATUS FOR MEASURING THE QUANTITY OF AIRFLOW PASSING THROUGH AN INTAKE PASSAGE OF AN ENGINE

BACKGROUND OF THE INVENTION

The present invention relates to an apparatus for measuring the quantity of intake airflow passing through an intake passage of an engine, and more specifically to an airflow quantity measuring apparatus which is so constructed that, in electronically controlling the quantity of fuel injected in an engine, an intake airflow quantity measurement signal is produced so as to be effectively used in an electronic control device as one of detection signals for the operating conditions of the engine, and which can be maintained effectively.

In electronically controlling an engine, the operating conditions of the engine are continually monitored, and signals indicative of the operating conditions are detected. For example, injection quantity, ignition timing, etc., are computed on the basis of the detection signals. Based on the results of such operation, the engine control is executed.

Means for detecting the operating conditions of the engine include an engine speed detector, engine temperature sensor, exhaust gas temperature sensor, throttle opening detector and other detectors. An apparatus for measuring the quantity of intake airflow is one such means that operates in direct connection with the engine conditions.

An airflow quantity sensor of a heat-wire type is conventionally known as an example of the intake airflow quantity measuring apparatus. This sensor includes a temperature-sensitive element which is disposed in an intake passage and is adapted to generate heat when supplied with a heating current so that the temperature change of the temperature-sensitive element responsive to the quantity of airflow in the intake passage is monitored. The temperature-sensitive element is formed of a resistance element, e.g., platinum wire, whose resistance value varies with temperature. The heating current, which is supplied to the resistance element, is controlled so that the resistance element is kept at a predetermined temperature. In this case, the resistance element is disposed in the intake airflow, so that its heat radiation effect is influenced by the quantity of airflow. Therefore, the heating current needs to be supplied in proportion to the quantity of airflow in the intake passage. Thus, the intake airflow quantity can be measured by determining the voltage value and change of the heating current.

In the airflow quantity measuring apparatus of this heat-wire type, however, the temperature-sensitive element as a measuring element should be exposed, in use, to the airflow in the intake passage for a long period of time. Also, heated during use, the temperature-sensitive element catches dust in the air, so that its thermal conductivity varies with the amount of dust thereon. If the dust on the temperature-sensitive element increases, the heat radiation effect of the temperature-sensitive element ceases to be accurately responsive to the quantity of intake airflow, increasing measurement errors.

A measure to overcome these disadvantages is stated in Japanese Patent Disclosure No. 76182/79, in which dust on a temperature-sensitive element is burned off by heating the temperature-sensitive element to 800° C. If subjected to such a high temperature for an extended time, e.g., 10 seconds or more, the temperature-sensitive element or its supporting members may possibly be damaged. In particular, the temperature-sensitive member, which is formed of a thin resistance wire, would be broken.

SUMMARY OF THE INVENTION

An object of the present invention is to provide an apparatus for measuring the quantity of intake airflow passing through an intake passage of an engine, in which the quantity of airflow in the intake passage is measured by supplying a heating current to a temperature-sensitive element disposed in the intake passage, and in which dust on the temperature-sensitive element is burned off to maintain the sensitivity of the temperature-sensitive element for a constantly accurate measurement output, without damaging the temperature-sensitive element and related members.

Another object of the invention is to provide an airflow quantity measuring apparatus in which the temperature of a temperature-sensitive element is allowed to increase only within a safe range when dust thereon is burned off, and in which the duration of heating current supply to the temperature-sensitive element for burning off the dust is limited within a safe range to ensure reliable airflow quantity measurement.

Still another object of the invention is to provide an airflow quantity measuring apparatus in which the burning-off operation for burning off dust on a temperature-sensitive element and airflow quantity measuring operation can readily be switched from one to the other by the use of, for example, an engine control unit, permitting simple construction of measurement control means.

A further object of the invention is to provide an arrangement in which a heating current supplied to a temperature-sensitive element for the burning-off operation is controlled in response to an airflow quantity measurement instruction signal and a burning-off instruction signal applied to a common input terminal portion.

In an airflow quantity measuring apparatus according to the present invention, the start of supply of a heating current controlled for a constant voltage to a temperature-sensitive element is controlled in response to a pulse signal as a heating start instruction of the commencement of periodic airflow quantity measurement, and the temperature increase of the temperature-sensitive element supplied with the heating current is monitored so that the heating current is caused to decay when it is detected that the difference between the temperature of the temperature-sensitive element and, e.g., the air temperature has reached a predetermined value. The duration of the heating current supply to the temperature-sensitive element is delivered as a measurement signal indicative of the airflow quantity in the intake passage. When a burning-off instruction is given, a burning-off heating current with a duration necessary of the burning-off operation and a constant voltage lower than the voltage of the heating current for the measuring operation is supplied to the temperature-sensitive element. In this case, the duration of the burning-off instruction signal is made sufficiently longer than the pulse duration of the measurement instruction pulse signal to be suited for the burning-off operation so that the two signals can be discriminated from each other. Also, the duration of the burning-off instruction signal is compared with a predetermined time interval for the burning-off operation for a reliable burning-off time control.

In the burning-off operation, according to airflow quantity measuring apparatus of the invention, the burning-off instruction signal is securely discriminated from the pulse signal for an airflow quantity measurement instruction during the normal airflow quantity measuring operation or other operation. Accordingly, the dust on the temperature-sensitive element can be burned off with use of a simple construction. In particular, the burning-off operation can be executed by effectively utilizing the arrangement for the airflow quantity measurement without damaging the temperature-sensitive element or other members. Thus, it is possible to measure with high reliability the quantity of intake airflow passing through the intake passage of the engine.

BRIEF DESCRIPTION OF THE DRAWINGS

FIG. 1 is a diagram for illustrating an engine control system using an airflow quantity measuring apparatus according to a first embodiment of the present invention;

FIGS. 2 and 3 show temperature-sensitive elements of different types constituting the airflow quantity measuring apparatus of the engine control system;

FIG. 4 is a circuit diagram of the airflow quantity measuring apparatus shown in FIG. 1;

FIGS. 5A to 5D are time charts for illustrating the flow of measuring operation of the airflow quantity measuring apparatus of FIG. 1;

FIGS. 6A to 6E are time charts for illustrating the burning-off control mode of the airflow quantity measuring apparatus of FIG. 1;

FIG. 7 shows a burning-off instruction signal discriminating section of an airflow quantity measuring apparatus according to a second embodiment of the invention;

FIG. 8 is a circuit diagram of an airflow quantity measuring apparatus according to a third embodiment of the invention.

DETAILED DESCRIPTION OF THE PREFERRED EMBODIMENTS

Figure 9A:
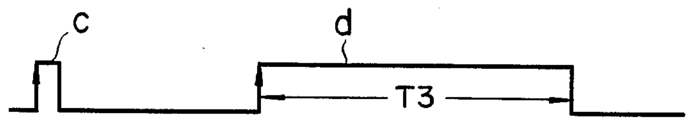
FIGS. 9A to 9F are time charts for illustrating various operating states of the apparatus shown in FIG. 8.

FIG. 1 shows a control system for an engine 11 which uses an apparatus for measuring a quantity of intake airflow. In this engine control system, fuel injection quantity is electronically controlled in accordance with the operating state of the engine 11.

Intake air supplied to the engine 11 is fed from an air filter 12 through a intake pipe 13. The intake air is distributed to individual cylinders of the engine 11 through the region of a throttle 15 which is driven by an accelerator pedal 14.

A temperature-sensitive element 17 constituting an airflow quantity measuring apparatus 16 of a heat-wire type is dispose in the intake pipe 13. The temperature-sensitive element 17 generates heat when it is supplied with a heating current. The temperature-sensitive element 17 is formed of a resistance element having a temperature-resistance characteristic that its resistance varies with its heating temperature. For example, the temperature-sensitive element 17 is formed of a heater made of a platinum wire.

A measurement signal indicative of the quantity of intake airflow in the intake pipe 13 measured by the airflow quantity measuring apparatus 16 is supplied to an engine control unit 18 which is formed of a microcomputer, including an arithmetic and logic unit for injection quantity control and injection timing control of the engine 11. The heating current for the temperature-sensitive element 17 is controlled by the engine control unit 18.

The engine control unit 18 is further supplied with a rotating speed signal from an engine speed sensor 19, an engine cooling water temperature detection signal, an air-fuel ratio detection signal, etc. The injection quantity best suited for the operating condition of the engine 11 is calculated on the basis of the detection signal indicative of the engine condition, and is supplied as a fuel injection time setting instruction signal to injectors 201 to 206 which are provided corresponding to the individual cylinders of the engine 11. Thus, the valve-opening duration is set for the control of the quantity of fuel to be injected.

In this case, the signals for setting the injection quantity are pulse signals with a predetermined duty. They are supplied to the injectors 201 to 206 through the current-controlling resistors 211 to 216.

The rotating speed sensor 19 includes cams 191 and 192 which are rotated coaxially with the engine 11 and a rotating plate 193 with a number of teeth. Electromagnetic pickups 194, 195 and 196 are opposed to the cams 191 and 192 and the rotating plate 193, respectively. A signal indicative of a specified rotation angle position of the engine 11 and a pulsating speed signal produced for each rotation through a specified angle are fetched from the pickups 194 to 196.

Fuel delivered from a fuel tank 23 by a fuel pump 22 is distributed to the injectors 201 to 206 by a distributor 24. The pressure of the fuel supplied to the distributor 24 is kept constant by a pressure regulator 25. The injection quantity can be accurately set in accordance with the valve-opening time of the injector section computed by the control unit 18.

The engine control unit 18 gives an instruction also to an igniter 26, and distributively supplies ignition instruction signals to ignition coils 281 to 286 corresponding to the individual engine cylinders through a distributor 27.

FIG. 2 extractively shows a specific construction of the temperature-sensitive element 17 constituting the airflow quantity measuring apparatus 16 which is used in the engine control system described above. In FIG. 2, a platinum resistance wire 172 as a resistance element with a temperature characteristic is wound around a ceramic bobbin 171. Support shafts 173 and 174 formed of a good conductor protrude individually from both end portions of the bobbin 171. The shafts 173 and 174 are supported by pins 175 and 176, respectively, which are also formed of a good conductor. Heating current is applied to the resistance wire 172 through the pins 175 and 176. The resistance wire 172 of the temperature-sensitive element 17 is exposed to the intake airflow in the intake pipe 13.

FIG. 3 shows a modified example of the temperature-sensitive element 17, in which the resistance wire 172 with a temperature characteristic is formed by printed wiring on an insulating film 177. The film 177 is supported on a substrate 178 which is formed of an insulator. Wires 179*a* and 179*b* connected to the resistance wire 172 are formed on the surface of the substrate 178, whereby the heating current is supplied to the resistance wire 172.

FIG. 4 shows a specific circuit configuration of the airflow quantity measuring apparatus 16 used in the aforesaid manner. In FIG. 4, the temperature-sensitive element 17 and an auxiliary temperature-sensitive element 30 are fixed inside the intake pipe 13. The auxiliary temperature-sensitive element 30, like the temperature-sensitive element 17, is formed of a resistance wire with a temperature characteristic, such as platinum. The resistance value of the auxiliary temperature-sensitive element 30 is set in accordance with the temperature of air passing through the intake pipe 13. Thus, the auxiliary temperature-sensitive element 30 constitutes air temperature measuring means which provides a temperature signal as a reference for monitoring the temperature of the temperature-sensitive element 17.

The two temperature-sensitive elements 17 and 30, along with fixed resistors 31 and 32 connected in series therewith, respectively, constitute a bridge circuit. Junctions a and b between the temperature-sensitive element 17 and the resistor 31 and between the auxiliary temperature-sensitive element 30 and the resistor 32 are connected individually to an input terminal portion of a comparator 33. If the temperature of the temperature-sensitive member 17 increases so that the difference between the temperature measured by the temperature-sensitive member 17 and air temperature measured by the auxiliary temperature-sensitive element 30 reaches a predetermined value, an output signal from the comparator 33 rises. A resistor for providing a hysteresis characteristic is connected to the comparator 33. The output signal from the comparator 33 is supplied as a reset instruction signal to a flip-flop circuit 34. In the airflow quantity measurement condition, the flip-flop circuit 34 is set by, for example, a signal produced in response to the rotation of the engine 11, more specifically, a start pulse signal which is responsive to a detection signal from the pickup 194 or 195. Namely, the flip-flop circuit 34 is set when the engine 11 reaches a specified rotation angle, and is reset when the temperature of the temperature-sensitive element 17 is increased to a specified level. A pulse signal with a set duration which falls and rises when the flip-flop circuit 34 is set and reset, respectively, is delivered from the reset output terminal $\overline{Q}$ of the flip-flop circuit 34. The output signal from the flip-flop circuit 34 is inverted by an inverter buffer 35, fetched as a measurement output signal, and supplied to the base of a transistor 36. The transistor 36 controls the base of a transistor 37 in accordance with the operating state of the flip-flop circuit 34. The transistor 37 is turned on and off when the flip-flop circuit 34 is set and reset, respectively.

The transistor 37 performs a switching operation for a power source for the bridge circuit including the temperature-sensitive elements 17 and 30. When the transistor 37 is on, the heating current is supplied to the temperature-sensitive element 17. In this case, a reference voltage from a reference voltage source 38 is supplied to a differential amplifier 39 through a resistor R1. The differential amplifier 39 compares the reference voltage with a voltage signal indicative of the heating current supplied to the temperature-sensitive element 17, and controls the base potential of the transistor 37. Thus, the heating current supplied to the temperature-sensitive element 17 in measuring operation is controlled for constant voltage.

The start pulse signal is first supplied to a monostable multivibrator 40 without being applied directly to the flip-flop circuit 34. The monostable multivibrator 40 is started in response to the leading edge of the start pulse signal, and produces a pulse signal with a pulse duration of 100 microseconds. This pulse signal is supplied as a set instruction signal to the flip-flop circuit 34 through an OR circuit 41.

While the set instruction signal is present, the flip-flop circuit 34 is in a set-first state such that it is kept set even if a reset instruction signal is coupled thereto. The duration of the set instruction signal for measuring operation is accurately set by the monostable multivibrator 40.

In burning off dust on the temperature-sensitive element 17 in the measuring apparatus 16 constructed in this manner, a burning-off instruction signal is delivered from the engine control unit 18. The burning-off instruction signal is supplied as a starting signal to a monostable multivibrator 42, which produces a pulse signal whose pulse duration is set to a time interval of three seconds which is equivalent to the heating time for the burning off. The output signal from the monostable multivibrator 42, along with the burning-off instruction signal, is supplied to an AND circuit 43. An output signal from the AND circuit 43 is supplied to the OR circuit 41 so that it is used as a set instruction signal for the flip-flop circuit 34.

The output signal from the AND circuit 43 is also supplied to the base of a transistor 44. In response to this, the transistor 44 is turned on to allow the reference voltage input terminal portion of the differential amplifier 39 to be grounded through a resistor R2. Namely, while the transistor 44 is being supplied with the output signal from the AND circuit 43, the reference voltage from the reference voltage source 38 is divided by the resistors R1 and R2 to set the reference voltage value of the differential amplifier 39. In this state, the temperature-sensitive element 17 is supplied with a heating current adjusted to a lower voltage than in the measuring operation.

Constructed in this manner, the measuring apparatus 16 performs an airflow quantity measuring operation in a state for the engine control. In the intake airflow quantity measurement, a start pulse signal is applied which is responsive to the rotation of the engine 11, as shown in FIG. 5A. The flip-flop circuit 34 is set in response to the start pulse signal. When the flip-flop circuit 34 is set, the transistor 37 is turned on to allow the heating current as shown in FIG. 5B to be supplied to the temperature-sensitive element 17, so that the temperature of the temperature-sensitive element 17 increases, as shown in FIG. 5C.

As the temperature of the temperature-sensitive element 17 rises in this manner, it resistance value increases. When the potential at the junction a is lower than the potential at the junction b set by the auxiliary temperature-sensitive element 30, that is, when the temperature of the temperature-sensitive element 17 is increased so much that the temperature difference between the temperature-sensitive element 17 and the air flowing through the intake pipe 13 is greater than the aforesaid predetermined value, a signal as shown in FIG. 5D is delivered from the comparator 33 to reset the flip-flop circuit 34. When the flip-flop circuit 34 is reset, the heating current (FIG. 5B) is cut off to the temperature-sensitive element 17. At the same time, the measurement output signal fetched through the inverter buffer 35 becomes a pulse signal with the same pulse duration as the signal shown in FIG. 5B.

The speed of temperature increase of the temperature-sensitive element 17 supplied with the heating current is responsive to the quantity of intake airflow passing through the intake pipe 13. More specifically, if the airflow quantity increases, the temperature increase speed is lowered in proportion. Therefore, the duration of the heating current shown in FIG. 5B is in proportion to the quantity of air flowing through the intake pipe 13. Namely, the pulse duration of an output signal fetched in the same situation represents a measured airflow quantity. This pulse duration may be measured by, for example, counting clock signals by means of the engine control unit 18. The count value serves as airflow quantity data represented by a digital signal.

If dust sticks to the temperature-sensitive element 17, requiring burning-off, a burning-off instruction signal is delivered from the engine control unit 18. In this case, the burning-off control should preferably be executed while the engine 11 is off. Thus, instead of the start pulse signal shown in FIG. 6A for starting the airflow quantity measuring operation, the burning-off instruction signal as shown in FIG. 6B is produced when the engine 11 is stopped and the intake airflow quantity need not be measured. The burning-off instruction signal has a duration T1 as indicated by symbol a in FIG. 6B. The duration T1 is a proper time interval for the burning-off operation.

The duration T2 of a signal produced by the monostable multivibrator 42 which is supplied with the burning-off instruction signal is set to the maximum allowable duration within which the temperature-sensitive element 17 cannot be damaged. The output signal from the monostable multivibrator 42 is as shown in FIG. 6C. Thus, the output signal from the AND circuit 43 is produced in a state as shown in FIG. 6D such that the burning-off instruction signal and the output signal of the monostable multivibrator 42 are both present, and serves as a set instruction signal for the flip-flop circuit 34.

The duration T1 of the burning-off instruction signal is long enough for the temperature-sensitive element 17 to be heated to a temperature high enough to burn off the dust on the temperature-sensitive elent 17. Therefore, the output signal from the comparator 33 rises while the burning-off instruction signal is present. As mentioned before, however, the flip-flop circuit 34 is designed for the precedence of set, so that it is kept in the set mode while the signal of FIG. 6D is present, allowing continued supply of the heating current to the temperature-sensitive element 17.

If the burning-off instruction signal delivered from the control unit 18 comes to have a duration sufficiently longer than the duration T1, as indicated by symbol b in FIG. 6B, for example, the output signal from the AND circuit 43 depends on the pulse duration T2 of the output signal from the monostable multivibrator 42. Thus, the set instruction signal for the flip-flop circuit 34 presents the state shown in FIG. 6D, and the duration of the heating current for burning off the dust on the temperature-sensitive element 17 is regulated by the monostable multivibrator 42 so that the temperature-sensitive element 17 and its supporting members are securely prevented from being damaged.

Since the transistor 44 is on while the heating current for the burning-off operation is being supplied to the temperature-sensitive element 17, the voltage level of the heating current in such a situation is as shown in FIG. 6E. Thus, as compared with a constant voltage V1 of the heating current supplied to the temperature-sensitive element 17 for the airflow quantity measurement, the voltage for the burning-off operation is set to V2 which is lower than V1.

As mentioned before, the burning-off control of the temperature-sensitive element 17 is preferably executed with the engine stopped. When the engine is off, there is no intake airflow in the intake pipe 13, so that the temperature-sensitive element 17 cannot obtain an airflow cooling effect. Thus, if the temperature-sensitive element 17 is supplied with the heating current on the same voltage level V1 as that for the airflow quantity measurement, it will be drastically heated resulting in damage. For the burning-off operation, the voltage level of the heating current supplied to the temperature-sensitive element 17 is made lower than that for the measuring operation.

FIG. 7 shows a second embodiment of the present invention, in which the start pulse signal for the execution of the airflow quantity measurement and the burning-off instruction signal are supplied to a common input terminal. Each of these input signals is supplied as a starting instruction for a monostable multivibrator 45 which is constructed in the same manner as the monostable multivibrator 42. An output signal from the monostable multivibrator 45, along with the input signal, is supplied to an AND circuit 46. In this case, the monostable multivibrator 45 is reset when the input signal is at a low level. The output signal from the monostable multivibrator 45 also rises in response to a rise of the input signal. The maximum duration of the output signal depends on the duration of the input signal.

If the start pulse signal with the short duration is applied to the input, a signal resembling the same is delivered from the AND circuit 46 to set the flip-flop circuit 34 for the execution of the airflow quantity measurement. If the burning-off instruction signal with the duration T1 is applied to the input, burning-off for the temperature-sensitive element 17 is executed in the same manner as described in connection with FIGS. 6A to 6D. In this case, the heating voltage for the burning-off operation is not controlled.

In the first embodiment shown in FIG. 4, the AND circuit 43 may be omitted so that the output signal of the monostable multivibrator 42 is coupled directly to the OR circuit 41 and supplied to the base of the transistor 44. With this arrangement, the duration for the burning-off operation may be determined only by the monostable multivibrator 42.

FIG. 8 shows a third embodiment of the present invention. In FIG. 8, like reference numerals are used to designate like portions as shown in FIG. 4. In this embodiment, as in the second embodiment shown in FIG. 7, the start pulse signal and the burning-off instruction signal are supplied as input signals to a common input terminal. Each input signal is first supplied to a monostable multivibrator 40, whose output signal is supplied as a set instruction to a flip-flop circuit 34 through an OR circuit 41. Thus, the airflow quantity measurement is executed in the same manner as in the first embodiment of FIG. 4.

Figure 9B:
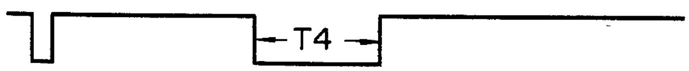

The input signal is also supplied as a trigger instruction to a monostable multivibrator 50, which is reset when the input signal is at a low level. The start pulse signal for the measuring operation has a sufficiently short pulse duration, as indicated by symbol c in FIG. 9A, while the burning-off instruction signal is a pulse signal with a pulse duration T3, as indicated by symbol d in FIG. 9A. The monostable multivibrator 50 constitutes discriminating-detecting means for discriminating between the start pulse signal and the burning-off instruction signal. A negative signal as shown in FIG. 9B is delivered from the terminal $\overline{Q}$ of the monostable multivibrator 50 in response to the leading edge of the input signal. If the input signal c with the short duration is applied, the negative output signal has a short duration equivalent to that of the input signal c. For the burning-off instruction signal d, the output signal has a duration T4 (e.g., one to three seconds) which is set by the monostable multivibrator 50. The duration T4, which is equivalent to a time interval for a burning-off decision, is sufficiently longer than the duration of the instruction signal c for the measuring operation and shorter than the time interval required for burning off.

Figure 9C:
Figure 9D:
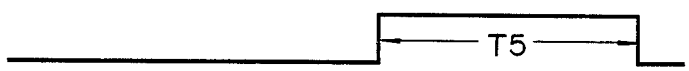
Figure 9E:
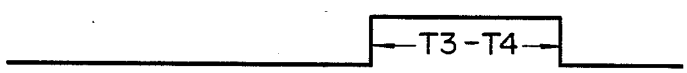
Figure 9F:
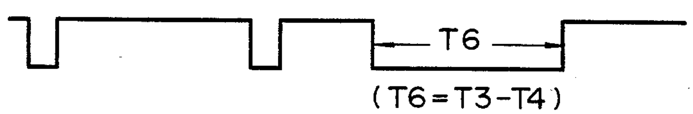

The output signal from the monostable multivibrator 50, along with the input signal, is supplied to an AND circuit 51. If the input signal is the signal d whose duration is longer than the duration T4 set by the monostable multivibrator 50, a burning-off instruction identification signal is delivered from the AND circuit 51. The output signal from the AND circuit 51 is supplied as a set instruction to a flip-flop circuit 52 which is reset in response to the input signal. Thus, the output signal of the flip-flop circuit 52 in the set mode is as shown in FIG. 9C. The output signal from the flip-flop circuit 52 is supplied as a starting instruction to a monostable multivibrator 53 which constitutes burning-off time limit setting means. An output signal with a duration T5 as shown in FIG. 9D is delivered from the monostable multivibrator 53. The output signal from the monostable multivibrator 53, along with the input signal, is supplied to an AND circuit 54. The AND circuit 54 produces a pulsating signal with a duration (T3–T4) equivalent to the difference between the durations T3 and T4, as shown in FIG. 9E. The output signal from the AND circuit 54 is supplied to the OR circuit 41, and also controls a transistor 44 to vary the voltage value of the heating current supplied to the temperature-sensitive element 17. Thus, a signal with a duration T6 equivalent to the duration (T3–T4) of the output signal for the AND circuit 54, as shown in FIG. 9F, is delivered from the flip-flop circuit 34, turning off a transistor 37 so that the temperature-sensitive element 17 undergoes a burning-off operation.

In this embodiment, the duration T6 for the burning-off operation is set by the monostable multivibrator 53 and the AND circuit 54. If the conduction time interval for burning off is allowed to be constant, however, the AND circuit 54 and the flip-flop circuit 52 may be omitted so that the output signal of the AND circuit 51 is supplied directly to the monostable multivibrator 53. In this case, the output signal of the monostable multivibrator 53 is used for the control of the OR circuit 41 and the transistor 44.

In the embodiments described above, electrical power of a constant voltage is supplied to the temperature-sensing element 17, the temperature changes of the element 17 are detected from the changes of the electric current flowing through the element 17, and this changing current the flip-flop circuit 34 is controlled when this current reaches a predetermined value, thereby obtaining a signal showing the quantity of intake airflow. Alternatively, electrical power of a constant current is supplied to the element 17, the temperature changes of the element 17 are detected from the changes of the resistance of the element, and the changes of voltage on the element 17 is detected from the resistance changes. The voltage is compared with a reference voltage, and the result of this comparison is used to control the flip-flop circuit 34. Also in this case, the quantity of intake airflow can be measured.

What we claim is:

1. An apparatus for measuring the quantity of airflow passing through an intake passage of an engine, comprising:

means for producing a supply electric power;

means disposed in the intake passage and adapted to generate heat while the supply electric power is being applied thereto, thereby measuring the quantity of airflow and burning off dust thereon;

means for producing a first signal indicative of the commencement of the measurement of the airflow quantity;

means for producing a second signal indicative of burning off dust;

means for limiting the duration of the second signal to a predetermined time interval equivalent to the maximum allowable duration for burning off dust;

means for comparing the temperature of the generating means with a reference temperature, said comparing means being adapted to produce a third signal indicative of the heat generating means reaching a predetermined temperature when the difference between the temperature of the heat generating means and the reference temperature reaches a predetermined value; and means for applying the supply electric power to the heat generating means during the time interval for the second signal independently of the third signal.

2. An apparatus according to claim 1, further comprising means responsive to the second signal and adapted to reduce the value of the supply electric power so that the heat generating means is supplied with the reduced supply electric power during the burning-off of the dust.

3. An apparatus according to claim 1, wherein said first signal is produced in synchronism with the rotation of the engine.

4. An apparatus according to claim 1, further comprising means for sensing the temperature of air passing through the intake passage and means for establishing the reference temperature in dependence on the sensed air temperature.

5. An apparatus according to claim 4, further comprising means responsive to the second signal and adapted to reduce the value of the supply electric power so that the heat generating means is supplied with the reduced supply electric power during the burning-off of the dust.

6. An apparatus according to claim 5, wherein said reducing means includes a constant-voltage control circuit with a reference voltage source for supplying the heat generating means with a heating electric power at a constant voltage, and means for shifting the voltage value of the reference voltage source of the constant-voltage control circuit to a low level, said shifting means being adapted to be driven in response to the second signal to shift the voltage value of the reference voltage source to a low level.

7. An apparatus according to claim 5, wherein said reducing means includes a constant-voltage control circuit with a reference voltage source for supplying the heat generating means with a heating electric power at a constant voltage, a resistance circuit for leading the reference-voltage power circuit for the power supply to the constant-voltage control circuit to a grounded circuit, and a switching element for switching the resistance circuit, said switching element being adapted to be turned on in response to the second signal to allow the reference-voltage power circuit to be grounded via the resistance circuit.

8. An apparatus for measuring the quantity of airflow passing through an intake passage of an engine, comprising:

heat generating means disposed in the intake passage and adapted to generate heat when supplied with a heating electric power;

constant-voltage control means with a reference voltage source for controlling the voltage value of the heating electric power supplied to the heat generating means in accordance with a reference voltage produced by the reference voltage source;

means for producing a first signal for controlling the rise of the heating current for airflow quantity measurement supplied to the heat generating means, said first signal being periodically produced in synchronism with the rotation of the engine;

means for producing a second signal with a sufficient duration to burn off dust on the heat generating means, so that the heating current is supplied to the heat generating means for a period of time equivalent to the duration of the second signal;

means for producing a third signal, said means consisting of a comparator for detecting an increase of the temperature of the heat generating means supplied with the heating current controlled by the first signal such that a predetermined difference is established between the temperature of the heat generating means and a reference temperature equivalent to the air temperature;

means for controlling the voltage supplied to the heat generating means, whereby the reference voltage produced by the reference voltage source of the constant-voltage control means is set to a lower value than that obtained during the time interval between the first and second signals; and means for preventing the supply of the heating electric power to the heat generating means from being cut off by the third signal while the second signal is present.

9. An apparatus according to claim 8, wherein said means for producing the second signal is formed of a monostable multivibrator for producing a signal with a predetermined duration, said monostable multivibrator being adapted to be started in response to a burning-off instruction signal produced while the engine is off.

10. An apparatus according to claim 8, wherein said means for producing the first and second signals include discriminating means for discriminating between a measurement start pulse signal with a short pulse duration and a burning-off instruction signal with a pulse duration sufficiently longer than that of the start pulse signal, said discriminating means producing a burning-off identification output whereby the pulse signal generating means for producing the second signal with the duration suited for burning off the dust on the heat generating means is started.

11. An apparatus for measuring the quantity of airflow passing through an intake passage of an engine, comprising:

heat generating means disposed in the intake passage and adapted to generate heat when supplied with a heating electric power;

switching means for switching the heating electric power supplied to the heat generating means;

constant-voltage control means including a reference voltage source for producing a reference voltage so that the voltage value of the heating electric power supplied to the heat generating means is equivalent to the reference voltage;

means for producing a first signal responsive to a start pulse signal as a measurement instruction produced periodically;

means for producing a second signal responsive to a burning-off instruction, the duration of said second signal being sufficiently long to burn off dust on the heat generating means;

comparing means adapted to produce a third signal on detecting an increase of the temperature of the heat generating means supplied with the heating electric power such that the difference between the temperature of the heat generating means and a reference temperature equivalent to the air temperature is greater than a predetermined value;

mode setting means adapted to be set to a first mode by the first and second signals, inverted by the third signal to be set to a second mode, held in the first mode without regard to the presence of the third signal while the second signal is present, and set to the second mode by the third signal in response to the trailing edge of the second signal, said mode setting means, when in the first mode, giving the switching means an instruction to start the heating electric power supply to the heat generating means;

voltage control means for keeping the voltage of the reference voltage source of the constant-voltage control means at a low voltage level while the second signal is present; and measurement output signal generating means for producing a signal with a duration within which the mode setting means is set to the first mode.

12. An apparatus according to claim 11, wherein said means for producing the second signal includes pulse signal generating means for producing a signal with the maximum allowable duration suited for the burning-off operation, said pulse signal generating means being adapted to be started in response to the leading edge of a burning-off instruction signal consisting of a pulse signal with a pulse duration suited for burning off, so that the output signal from the pulse signal generating means and the burning-off instruction signal are supplied to logical product means.

13. An apparatus according to claim 11, wherein said means for producing the first and second signals include first pulse generating means adapted to be supplied with an input signal consisting of a start pulse signal with a short pulse duration for a measuring operation or a burning-off instruction signal with a pulse duration sufficiently longer than that of the start pulse signal, and to be started in response to the leading edge of the input signal to change the mode setting means to the first mode; second pulse signal generating means adapted to be started in response to the input signal to produce a signal with a pulse duration longer than that of the start pulse signal and shorter than that of the burning-off instruction signal; logical product means supplied with the output signal from the second pulse signal generating means and the input signal and adapted to produce an output signal when supplied with the burning-off instruction signal; and third pulse signal generating means adapted to be started in response to the output signal from the logical product means to produce a signal with a duration suited for burning-off within which the mode setting means is in the first mode.

* * * * *